United States Patent

Kimura et al.

[11] Patent Number: 5,825,888
[45] Date of Patent: Oct. 20, 1998

[54] DESCRAMBLING DEVICE

[75] Inventors: Kazuhiro Kimura; Shigeaki Hayashibe; Toshiyuki Ozawa; Tatsuo Hiramatsu; Yoshikazu Tomida, all of Moriguchi, Japan

[73] Assignee: Sanyo Electric Co., Ltd., Osaka, Japan

[21] Appl. No.: 712,123

[22] Filed: Sep. 11, 1996

[30] Foreign Application Priority Data

Sep. 11, 1995 [JP] Japan ................................ 7-232631

[51] Int. Cl.$^6$ ................................................ H04L 9/00
[52] U.S. Cl. ................................................ 380/49; 380/10
[58] Field of Search ................................ 380/9, 10, 21, 380/46, 48, 49

[56] References Cited

U.S. PATENT DOCUMENTS 4,449,247  5/1984  Waschka et al. ........................ 380/49
4,511,919  4/1985  Forgey et al. .......................... 380/10

OTHER PUBLICATIONS

"Technical Conditions for Data Broadcasting Using Satellite Broadcasting".

*Primary Examiner*—David C. Cain
*Attorney, Agent, or Firm*—Loeb & Loeb LLP

[57] ABSTRACT

In a packet analyzing circuit, first and second key data are detected and stored in respective first and second key data registers. First and second key generation circuits generate first and second keys from the first and second key data. An exclusive OR operation is carried out to both keys so as to generate a scrambling key. Using the scrambling key as an initial value, a random number generator generates a PN code used for scrambling, so that scrambled data is descrambled by adding the PN code to the data. The first key generation circuit, which receives a control signal CON from a timing generation circuit, is controlled by the control signal CON such that a scrambling key is generated only when the random number generator needs an initial value.

15 Claims, 9 Drawing Sheets

| CON | A1 | A0 | B3 | B2 | B1 | B0 | COMMENTS |
|---|---|---|---|---|---|---|---|
| 0 | 0 | 0 | 1 | 1 | 1 | 1 | INEFFECTIVE OUTPUT |
| 0 | 0 | 1 | 1 | 1 | 0 | 0 | |
| 0 | 1 | 0 | 0 | 0 | 1 | 1 | |
| 0 | 1 | 1 | 0 | 0 | 0 | 0 | |
| 1 | 0 | 0 | 0 | 0 | 0 | 0 | EFFECTIVE OUTPUT |
| 1 | 0 | 1 | 0 | 0 | 1 | 1 | |
| 1 | 1 | 0 | 1 | 1 | 0 | 0 | |
| 1 | 1 | 1 | 1 | 1 | 1 | 1 | |

DESCRAMBLING DEVICE

BACKGROUND OF THE INVENTION

1. Field of the Invention

The present invention relates to a descrambling device for use in a receiver for FM multi-channel broadcasting in which a data packet constituting a given number of digital data is scrambled and multiplexed for general FM broadcasting and, in particular, to a receiver for FM multi-channel broadcasting in which transmission data contains key data for descrambling.

2. Description of the Prior Art

An FM multi-channel broadcasting in which digital data is overlapped onto FM broadcast waves has been put to practical use, wherein text data is transmitted. Provision of traffic information through FM multi-channel broadcasting is being planned, which promotes the idea of Vehicle Information and Communication System (VICS) in which a navigation system equipped to a vehicle receives the traffic information transmitted in the form of digital data to utilize for route guidance or the like.

A suggestion has been made that the VICS service should be kept available exclusively to members by scrambling data. An adaptable scrambling method is introduced in a publication titled "Technical Conditions for Data Broadcasting Using Satellite Broadcasting" issued by HOSO GIJYUTSU KAIHATSU HYOGIKAI, in June 1993, which discloses a concrete method of scrambling and descrambling for satellite broadcasting.

Although scrambling and descrambling for satellite broadcasting may be achieved using the method disclosed in the above publication, it is still necessary to develop a scrambling/descrambling method adaptable to FM multi-channel broadcasting because a data packet transmitted for FM multi-channel broadcasting has a different construction from that of a data packet transmitted for satellite broadcasting.

SUMMARY OF THE INVENTION

The present applicant proposed a scrambling/descrambling method adaptable to FM multi-channel broadcasting in Japanese Patent Application No. Hei 7-72740 (not published). In this method, key data to be held in a data packet is first determined, and a scrambling key is then generated based on the key data. Then, using the scrambling key as an initial value, a given random number is generated to be used as a PN code for data scrambling. A given range within a data packet to be transmitted is next scrambled, using the obtained PN code. The key data is kept in an area which is not scrambled.

On the receiver side, a receiver extracts the key data from the transmission data and generates a scrambling key and a PN code, based on the key data, in the same way as a sender side, so that scrambled data within a given range of the received data packet is descrambled, using the PN code obtained.

As described above, preferable scrambling/descrambling can be achieved for FM multi-channel broadcasting.

In the foregoing system, it is necessary to ensure a higher level of secrecy of a scrambling key as it is important data for descrambling. The above-mentioned system, however, has a problem in that the logic for generating a scramble data based on a key data may be easily deciphered. This problem raises from the fact that, in the above-mentioned system, a scrambling key, which is generated based on key data transmitted for every data packet is not updated until the next data packet having a different key data is received and the current key data is updated. The current scramble data remains the same until the next receipt of key data, which makes it likely that scramble logic can be easily deciphered. When such a circuit is intergrated in a semiconductor integrated circuit (LSI), which is often the case, a problem still exists in that scrambled data may be easily deciphered when the LSI is opened and the signal condition inside is examined.

The present invention was conceived to overcome the above problems and thus aims to provide a descrambling device in which deciphering descrambling configuration is difficult.

The present invention relates to a descrambling device for use in a receiver for FM multi-channel broadcasting in which a data packet constituting a given number of digital data is scrambled and multiplexed for general FM broadcasting.

The present invention comprises a key data holding circuit for holding key data extracted from a given part of a data packet transmitted; a scrambling key generation circuit for generating a scrambling key, based on the key data held in the key data holding circuit; a random number generator for generating a random number, using the scrambling key as an initial value, the scrambling key being generated by the scrambling key generation circuit; a logical circuit for descrambling transmission data scrambled, based on the random number generated by the random number generator; and a timing generation circuit for outputting a timing signal in response to a receiving timing of data within the data packet transmitted; wherein the timing signal output by a timing generation circuit controls generation timing of the scrambling key in the scrambling key generation circuit.

In this way, the generation timing of a scrambling key is governed by the timing generation circuit. As a result, it is possible to manipulate generation of a scrambling key as desired, such as to limit the generation to only within a necessary period, or the like, which contributes to improved scrambling secrecy.

Further, the above scrambling key generation circuit is characterized by a scrambling key which is generated only during a given period, in response to the timing signal output from the timing generation circuit. Thus, the period of time when a scrambling key is at risk to be examined through observation of a signal is shortened, which makes it unlikely for the scrambling key to be deciphered.

According to another aspect of the present invention, a descrambling device comprises a first key data holding circuit for holding key data extracted from a first given part of a data packet transmitted; a second key data holding circuit for holding key data extracted from a second given part of a data packet transmitted; a first key generation circuit for generating a first key, based on the first key data held in the first key data holding circuit; a second key generation circuit for generating a second key, based on the second key data held in the second key data holding circuit; a first logical circuit for executing a logical operation to the first and second keys generated by the first and second key generation circuits, respectively, so as to generate a scrambling key; a random number generator for generating a random number, using the scrambling key as an initial value, the scrambling key being generated by the logical circuit; a second logical circuit for descrambling transmission data scrambled, based on the random number generated by the random number generator; and a timing generation circuit for outputting a timing signal in response to a receiving timing of data within the data packet transmitted.

According to a further aspect of the present invention, the timing signal output by the above timing generation circuit controls timing of generation of the first key in the first key generation circuit. To summarize, provision of two kinds of key data, as described above, will achieve more advanced scrambling and ensured generation control over a scrambling key, using a relatively simple means for controlling generation of a first key.

According to a further aspect of the present invention, the first key generation circuit generates a first key during only a given period, in response to the timing signal output from the timing generation circuit.

According to a still further aspect of the present invention, the timing generation circuit includes analyzing means for analyzing prefix data of the data packet in the transmission data and controls a descrambling operation, based on the content of the prefix data which has been detected by the analyzing means. In other words, when a data packet includes data which has not been scrambled, a descrambling operation can be controlled so as to avoid needless descrambling, such as descrambling data not scrambled, through generation control of a scrambling key with reference to the content of prefix data, including a data packet number.

According to yet another aspect of the present invention, the timing generation circuit includes a bit position recognition circuit for recognizing positions of respective data within a data packet, and controls a descrambling operation, based on a recognition result by the bit position recognition circuit. In other words, since a data packet contains scrambled bits and not scrambled bits depending on a bit position, recognition of bit position will allow control over a descrambling operation.

According to yet another aspect of the present invention, the timing generation circuit includes analyzing means for analyzing prefix data of a data packet in the transmission data and a bit position recognition circuit for recognizing positions of respective data within the data packet, and controls a descrambling operation, based on both of the content of the prefixed data which has been detected by the analyzing means and the recognition result by the bit position recognition circuit.

According to a still further aspect of the present invention, the random number generator includes a shift register of a given number of bits for receiving the scrambling key as an initial value, and a logical feedback circuit for executing a logical operation using a given output of the shift register and for feeding back an operation result, the given output of the shift register comprising a plurality of bits.

BRIEF DESCRIPTION OF THE DRAWINGS

The above and the other objects, features and advantages will be further apparent from the following description of the preferred embodiment taken in conjunction with the accompanying drawings wherein.

DESCRIPTION OF THE PREFERRED EMBODIMENTS

A preferred embodiment of the present invention will next be described, based on the following drawings.

Construction

Figure 1:
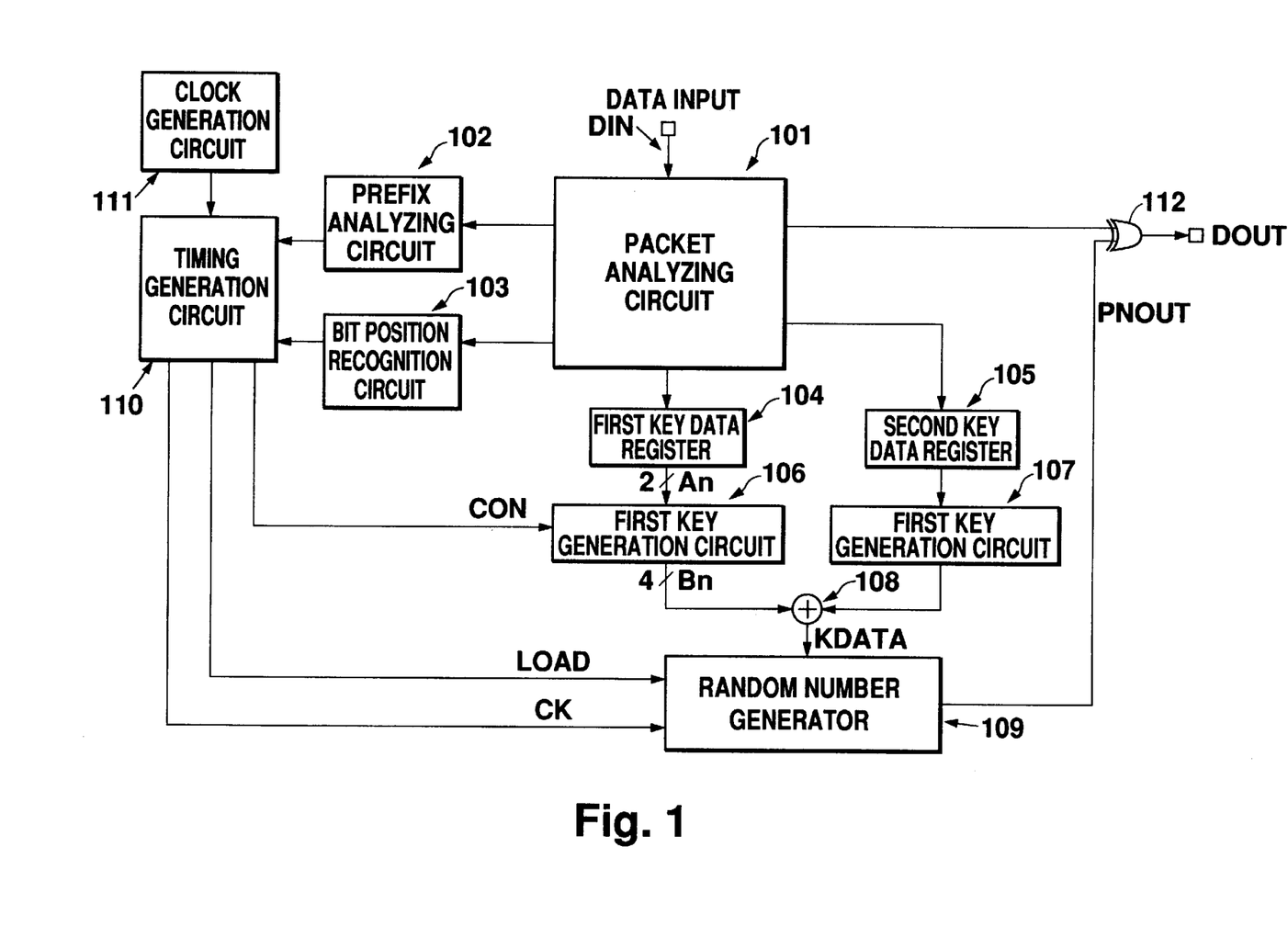
FIG. 1 is a block diagram showing an entire structure of a preferred embodiment.

FIG. 1 is a block diagram showing a construction of a preferred embodiment, in which multiplex data is received by an FM multiplex receiver and extracted via a band pass filter. The extracted data is processed in an LSI which executes demodulation and error correction to data, and input in the form of a given format into a packet analyzing circuit 101 via a data input terminal DIN. Since the operations up to demodulation and error correction are conducted using a known construction, explanations thereof are omitted here. The packet analyzing circuit 101 extracts a prefix from a predetermined part within the data input (data is formed into a packet as a unit) and supplies the extracted prefix to a prefix analyzing circuit 102. The prefix analyzing circuit 102 obtains a data packet number, etc., through analyzing the data content of the prefix.

The packet analyzing circuit 101 supplies the packet data to a bit position recognition circuit 103, which in turn searches bit positions of respective data within the supplied data packet.

Further, the packet analyzing circuit 101 extracts a first key data from a predetermined bit position within the data packet and supplies the extracted first key data to a first key data register 104. The packet analyzing circuit 101 also extracts a second key data from another predetermined bit position within the data packet and supplies the extracted second key data to a second key data register 105. The first and second key registers 104 and 105 hold the first and second key data, respectively.

The first key data held in the first key data register 104 is supplied to a first key generation circuit 106, which in turn generates a first key, based on the first key data supplied, wherein the first key has a predetermined relationship with the first key data. The second key data held in the second key data register 105 is supplied to a second key generation circuit 107, which in turn generates a second key.

The first and second key generation circuits 106 and 107 respectively supply the first and second keys to an exclusive OR circuit 108, where an exclusive OR operation is executed to both the supplied keys. The exclusive OR circuit 108 is represented by an adder in FIG. 1 as an exclusive OR operation is equivalent to an adding operation of digital data.

The output of the exclusive OR circuit 108, which is a scrambling key (KDATA), is supplied to a random number generator 109. Using the scrambling key as an initial value, the random number generator 109 generates a descrambling code (PNOUT).

Meanwhile, the prefix analyzing circuit 102 and the bit position recognition circuit 103 respectively supply the data packet number and data regarding the bit position within the data packet to a timing generation circuit 110. Recognizing the data packet number and the bit position, the timing generation circuit 110 generates a control signal (CON) for controlling an operation of the first key generation circuit 106, and an initial value load signal (LOAD) and a random number generation clock (CK) to be supplied to the random number generator 109. Note that the generation of the above signals and a clock by the timing generation circuit 110 is carried out based on a clock signal supplied thereto from a clock generation circuit 111.

Responding to the control signal (CON), the first key generation circuit 106 generates a first key only during a period of time which corresponds to the timing for loading an initial value to the random number generator 109. The random number generator 109 takes a scrambling key into its shift register according to the timing designated by the initial value load signal (LOAD) and shifts data within the shift register according to the timing designated by the random number generation clock (CK), thereby generating a given random number.

The output of the random generator 109, i.e., PNOUT, is supplied to the exclusive OR circuit 112, which also receives a packet data from the packet analyzing circuit 101 in synchronism with the receipt of PNOUT. The exclusive OR circuit 112 carries out a descrambling operation so as to output descrambled data DOUT. For output of data which does not need to be descrambled, the random number generator 109 does not generate a random number, and the exclusive OR circuit 112 thus outputs packet data intact.

Operation

Figure 2:
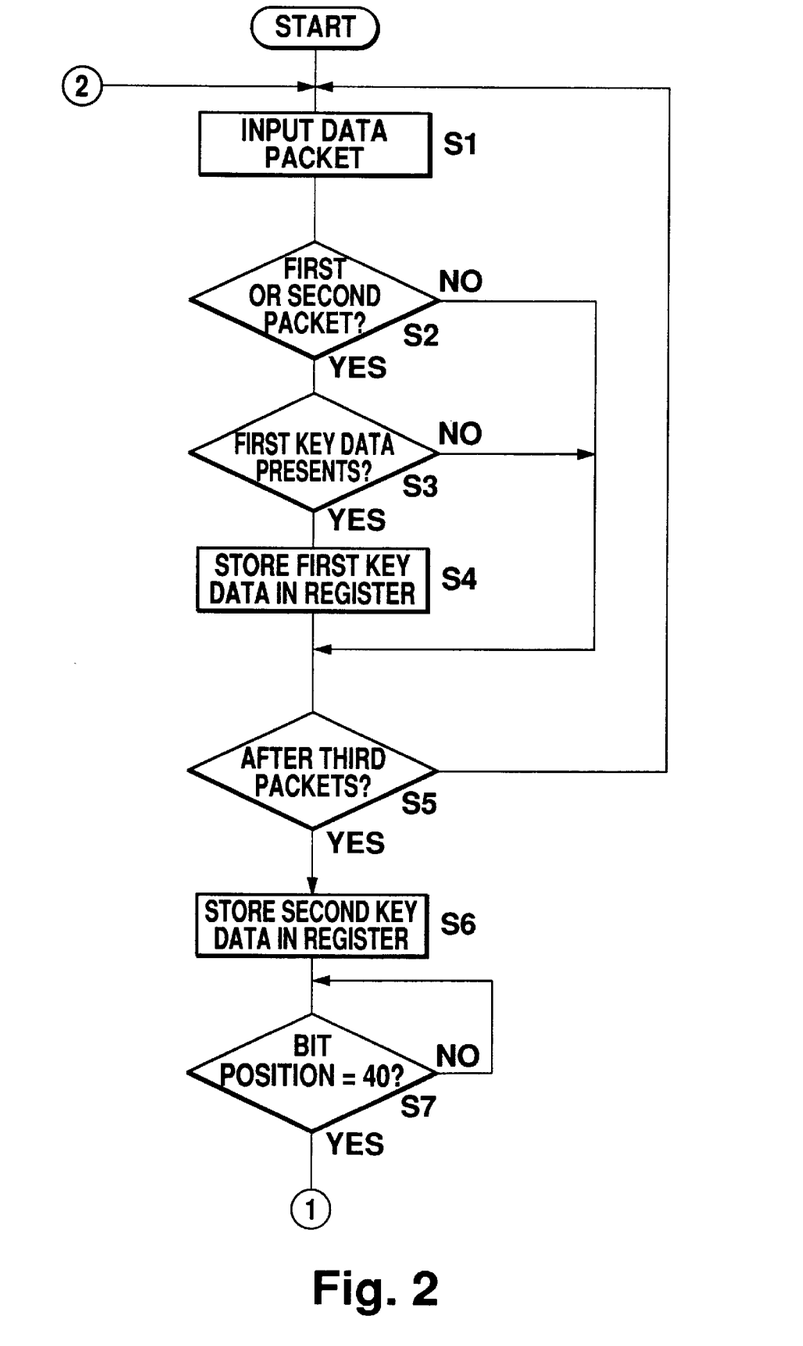
FIG. 2 is a flowchart showing an operation of a preferred embodiment.
Figure 3:
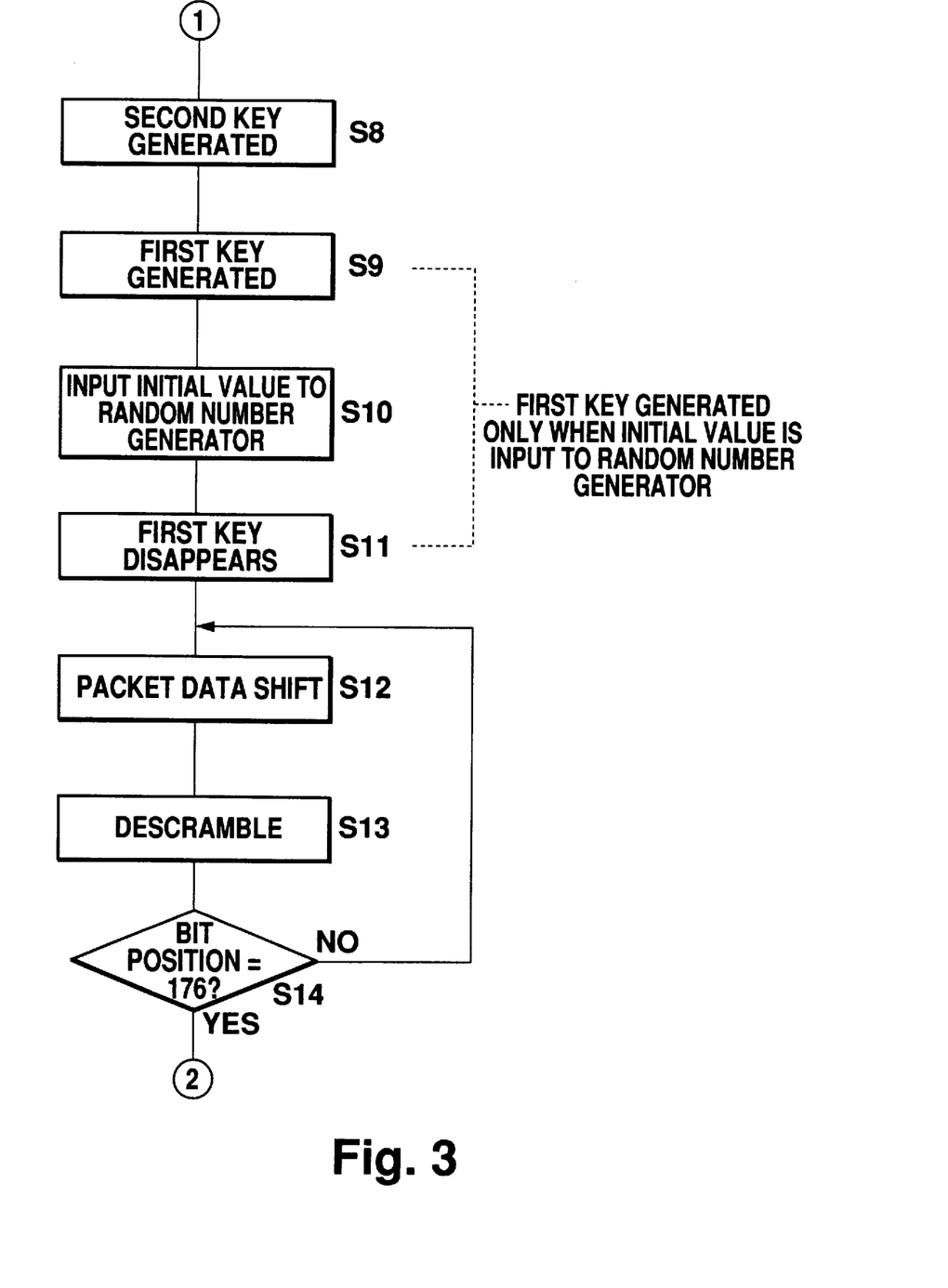
FIG. 3 is a flowchart showing an operation of a preferred embodiment.

The operation of this preferred embodiment will next be described, based on the flowchart in FIGS. 2 and 3.

Figure 4:
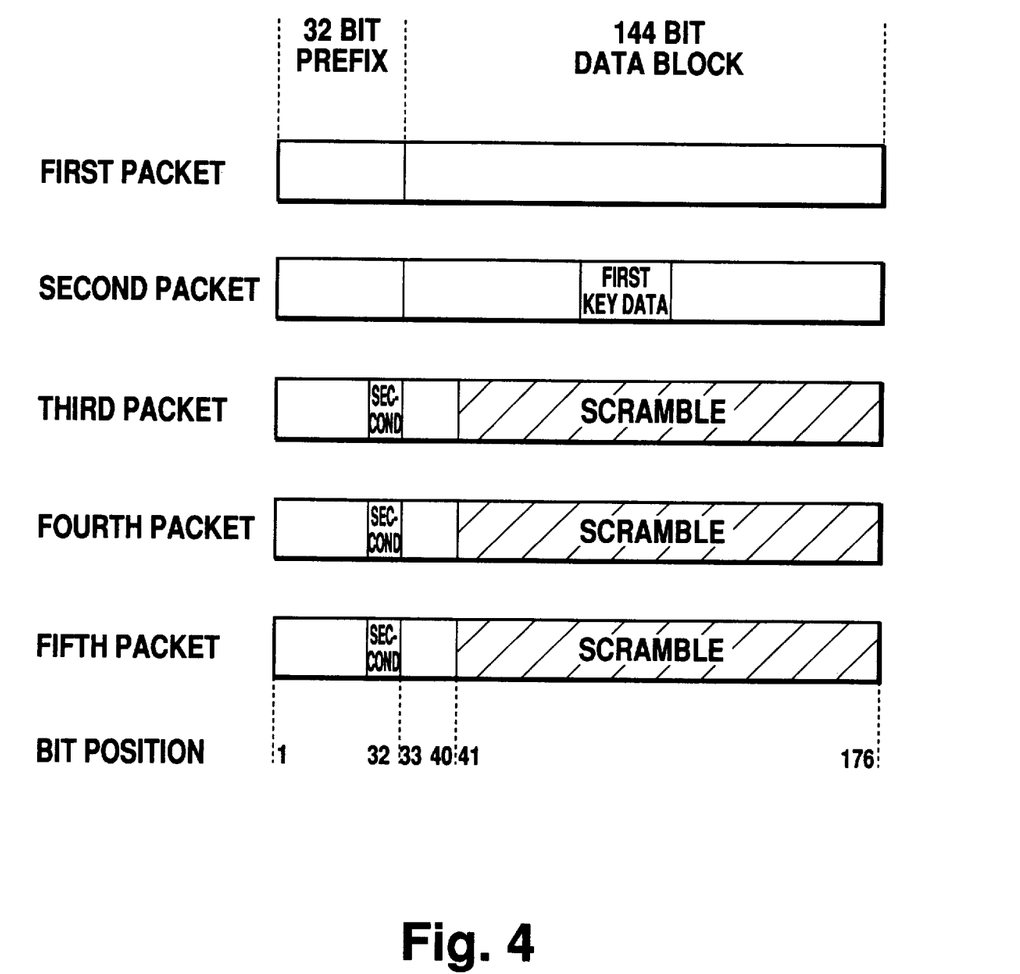
FIG. 4 shows the construction of a data packet.

A receiver supplies a data packet received to the packet analyzing circuit 101 (S1). The packet analyzing circuit 101 then detects whether or not the supplied data packet is a first/second packet through analyzing the content of a prefix held at the 0th to 32nd bit thereof (S2). Note that a data packet comprises 176 bit data, as shown in FIG. 4, which are a received data block excluded a block identification code and an error correction code, wherein the data packet consists of a prefix of the front 32 bits and a data block of subsequent 176 bits. Combining data blocks for a plurality of packets will constitute a data group, in which a data header is provided to the head of the data group data within the data group.

In cases where a judgement is made at S2 that the supplied data packet is a first/second packet, it is further detected whether or not first key data presents (S3). With first key data presenting, the first key data is supplied to the first key register 104 to be held therein (S4). Note that the four bits immediately after the data head of the above data group data are allotted to first key data, which is located in the second packet as shown in FIG. 4. As this position is detectable from the data content, extraction of data from this position resultantly constitutes extraction of first key data. A data format which does not contain first key data in the above position may be also possible. With such a data format, first key data may be extracted from a predetermined position. When a first key data has been scrambled in a predetermined manner, the first key data is extracted and descrambled in a predetermined manner and then stored in the first key data register 104.

In the case where negative judgement is made at S2 or S3 or the first key data is stored in the first key data register 104 at S4, it is detected whether or not the concerned data packet is the third/subsequent packet (S5). When it is not, the operation returns to S1, so that the next data packet is input. When it is the third/subsequent packet, a second key data is stored in the second key data register 105 (S6). As shown in FIG. 4, the second key data is held in a predetermined position within the third to seventh packets (whose packet numbers are two to six, respectively), wherein the second key data is stored as the data group number within a prefix or a data packet number, etc.

When the second key data is stored in the second key data register 105 at S6, the position of the 40th bit is detected (S7). This detection is made to determine the start of descrambling, because a scrambled bit range is between the 41st and 176th bits in the respective third to seventh packets.

Upon detection of the bit position of the 40th bit, the second key generation circuit 107 generates a second key (S8). The second key is generated through randomization in a given method based on the second key data.

Next, the first key generation circuit 106 generates a first key (S9) through conversion into data having pre-stored larger number of bits, with reference to the first key data.

When first and second keys are generated, an exclusive OR operation is conducted to both the keys so as to generate a scrambling key (KDATA) to be input to the random number generator 109 as an initial value (S1O). Upon completion of inputting a scrambling key, the first key is canceled through replacing the first key with invalid data (S11).

Receiving the scrambling key, the random number generator 109 generates a random number (a descrambling code), using the scrambling key (KDATA) as an initial value. Utilizing this random number, which is a code actually used for scrambling transmission data, scrambled bits of the packet data are descrambled to the final bit thereof while shifting the packet data (S12–S14).

Timing chart

Figure 5:
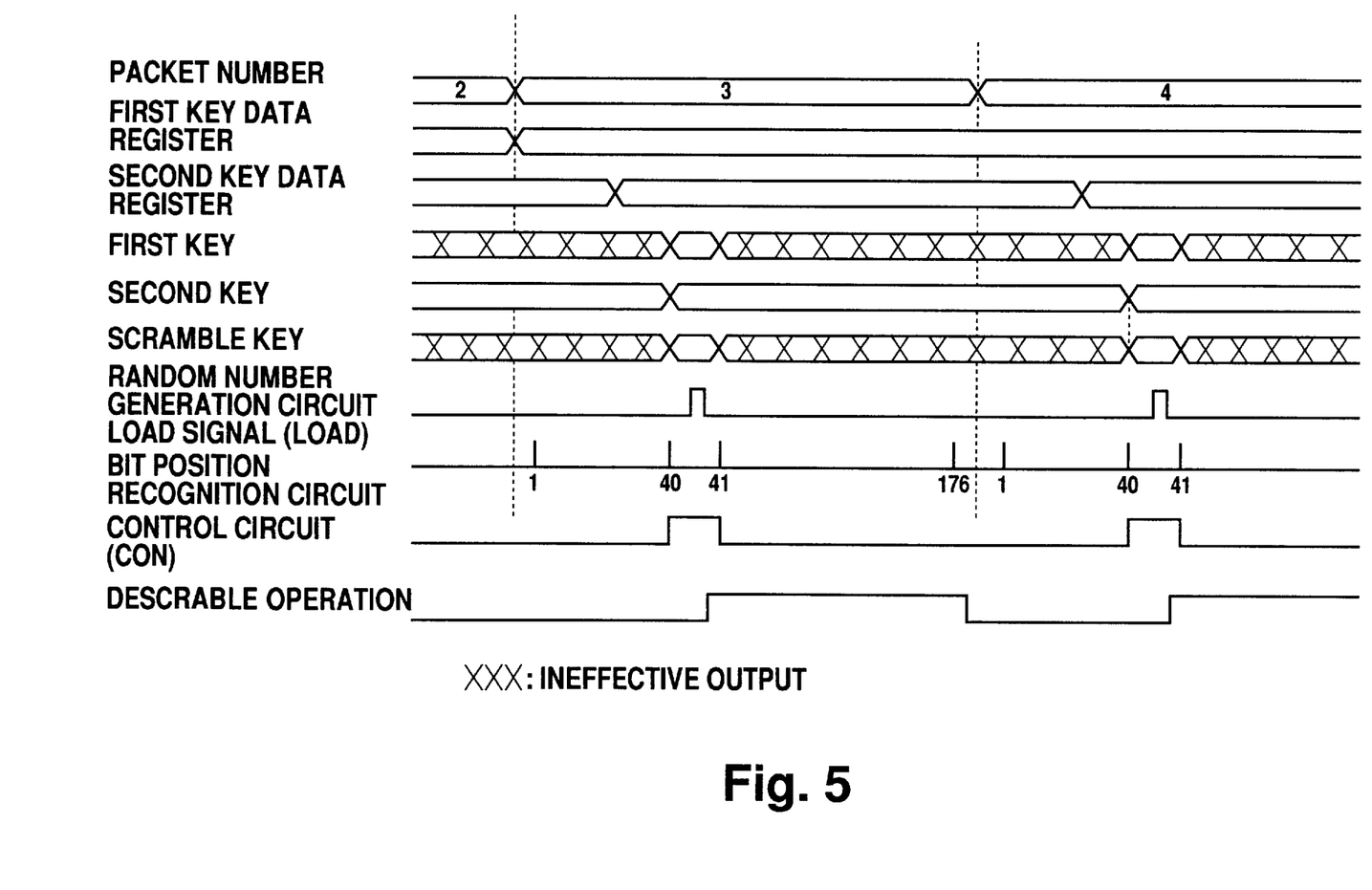
FIG. 5 is a timing chart showing an operation timing of a preferred embodiment.

FIG. 5 is a timing chart which shows an operation of this preferred embodiment, in which data packets 2 to 4 are input. The first key data, which is usually held in the second packet, is confirmed at the time when the third packet is input, thereby updating storage content of the first key data register 104. The second key is confirmed at the time when prefixes of the third to seventh packets are input. That is, storage content of the second key data register 105 is updated at every input of a prefix of each packet.

The first key generation circuit 106 generates a first key during only a period corresponding to the 40th to 41st bit positions. The second key has been confirmed and updated when the processing bit position reaches the 40th bit position. A scrambling key (KDATA) is output during only a period when the first key is generated.

When the timing generation circuit 110 is informed that the processing bit position reaches the 40th bit, it generates a load signal (LOAD) for designating a generation timing of a scrambling key to be supplied to the random number generation circuit 109. The first key generation circuit 106 is controlled such that it generates a first key only when a load signal (LOAD) indicates H.

A descrambling operation, that is, an operation for adding an output of the random number generator 109 to a packet data (in other words, an operation for obtaining an exclusive OR), is carried out to the 41st to 176th bits of the respective third to seventh packets which are scrambled.

As described above, in this preferred embodiment, a period of time when a scrambling key (KDATA) is generated is shortened as a first key is generated only during a short given period of time. Accordingly, even if an IC having a descrambling function is opened and inner signal operations are examined, the scrambling key, which is extremely important for descrambling, is unlikely to be deciphered. With this arrangement, it is possible to enhance security of a scrambling operation with a relatively simple means for controlling generation of a first key.

Construction of a first key generation circuit

Figure 6:
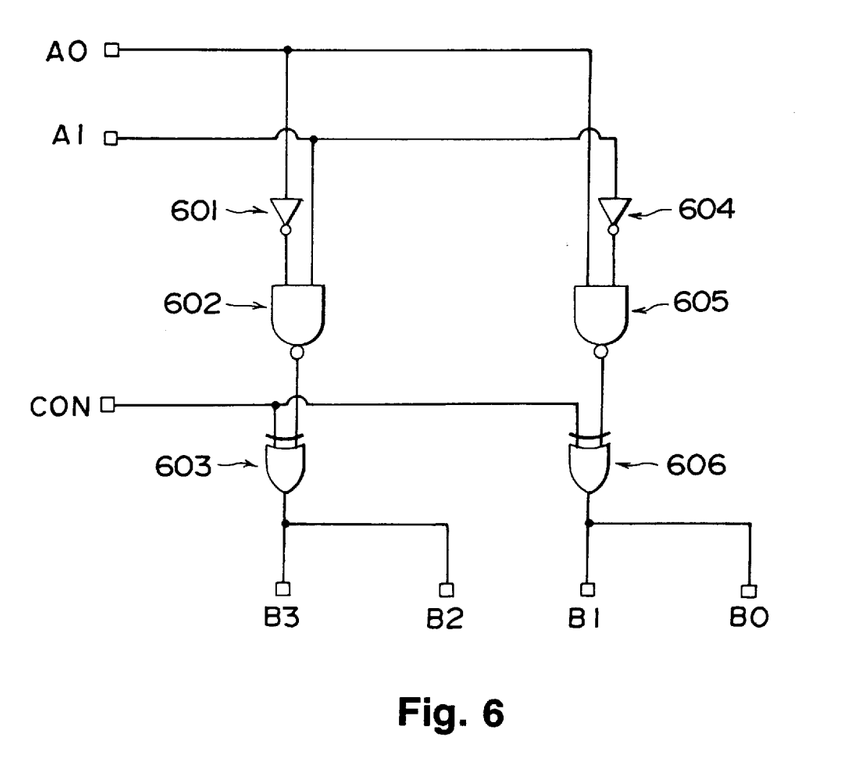
FIG. 6 shows the construction of a first key generation circuit.

FIG. 6 shows a construction of the first key generation circuit 106. In the drawing, the first key generation circuit 106 comprises a first key generation circuit 106, inverters 601, 604, NAND gates 602, 605, and exclusive OR gates 603, 606 and generates 4 bit first keys B0, B1, B2, B3 from 2 bit key data A0, A1 for output.

The NAND gate 602 receives a key data A1 and a key data A0 inverted by the invertor 601. The exclusive OR gate 603 receives an output of the NAND gate 602 and a control signal CON. The NAND gate 605 receives a key data A0 and a key data A1 inverted by the invertor 604. The exclusive OR gate 606 receives an output of the NAND gate 604 and a control signal CON. The exclusive OR gates 606 and 603 output first keys B0, B1, and first keys B2, B3, respectively.

Figure 7:
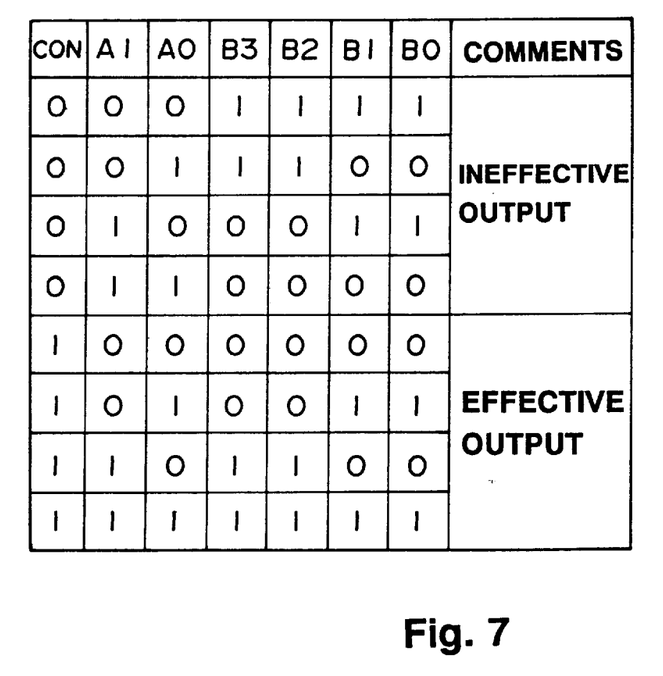
FIG. 7 shows true values of the first key generation circuit.

True values of the above first key generation circuit 106 are shown in FIG. 7, in which a control signal CON being zero causes an ineffective output. In this circuit, 2 bit key data is converted into a 4 bit first key. Further, a control signal CON allows generation of a first key which is effective during only a given period.

Note that, although a 4 bit first key is generated from a 2 bit first key data in the foregoing construction, in actual use a 32 bit master key is generated from a 16 bit master key number.

Construction of a random number generator

Figure 8:
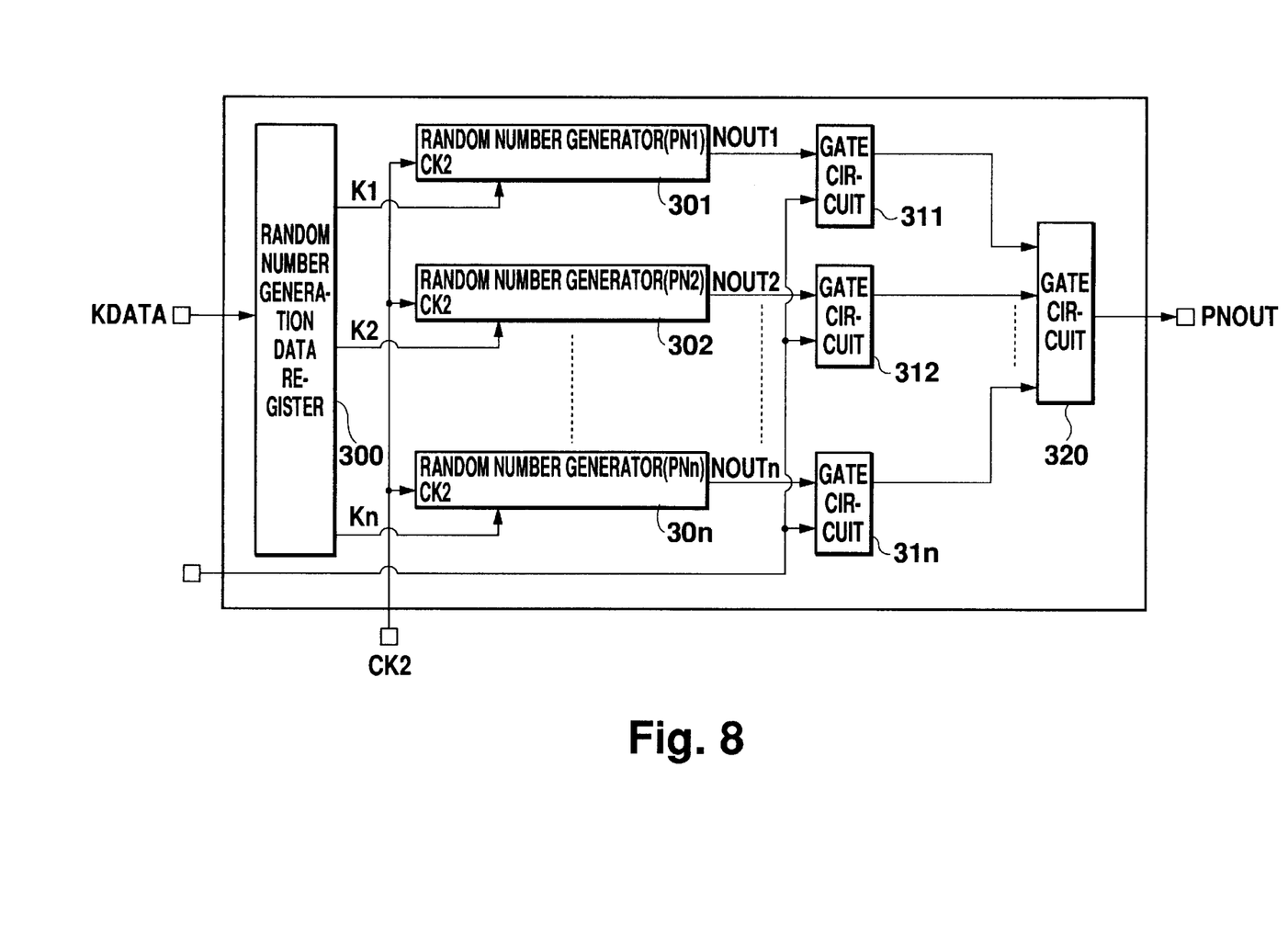
FIG. 8 is a block diagram showing the construction of a random number generator.

FIG. 8 shows a construction of the random number generator 109. A scrambling key (KDATA) is input into a random number generation data register 300 to be held therein. Data k1, k2 ... kn which are held at given parts within the random number generation data register 300 are supplied to n random number generators 301–10n, respectively. The random number generators 301–30n each consist of shift registers, to which a clock CK is supplied. In response to the clock CK, the random number generators 301–30n respectively output random numbers NOUT1–NOUTn which correspond to respective initial values. The random numbers NOUT1–NOUTn are supplied to the gate circuits 311–31n, respectively. Each of the gate circuits 311–31n, comprising a logical circuit, such as an AND or OR circuit, also receives a correction control data comprising a part (e.g., 4 bits) of a data packet number contained in each packet, so that the random numbers NOUT1–NOUTn are corrected in the gate circuits 311–31n, respectively.

The respective gate circuits 311–31n supply their outputs to a gate circuit 320, where all the outputs are added for every bit, so that a descrambling code PNOUT is output for every bit.

In the above construction, a given descrambling code PN is obtained from a scrambling key. It may be constructed such that the random number generation data register 300 outputs correct data k1–kn only when necessary for loading into respective random number generators 301–30n. For instance, the random number generation data register 300 takes in a scrambling key (KDATA) upon a rise of a load signal (LOAD) and outputs data k1–kn so that the random number generators 301–30n accept them upon a fall of the load signal (LOAD). The random number generation data register 300 may further take in the next ineffective scrambling key at the 41st bit position.

Figure 9:
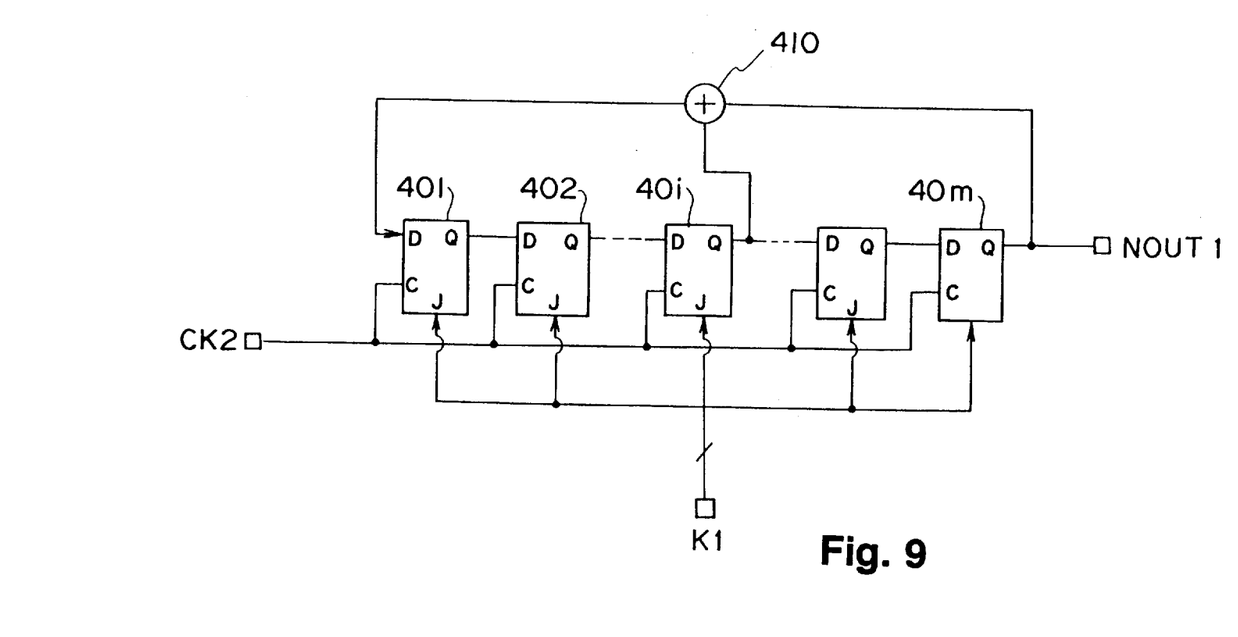
FIG. 9 is a block diagram showing the construction of a random number generator.

FIG. 9 shows a construction of a random number generator 301–30n. In this drawing, m shift registers 401–40m are provided such that an output Q of a shift register is supplied to its subsequent shift register via the input D thereof, and the output of the last shift register is supplied to the first shift register via the input D thereof through an exclusive OR gate 410. Further, the exclusive OR gate 410 receives, at its other end, an output Q of one predetermined shift register 40i (i is either one of 1 to m) of the shift registers 401–40m.

Each shift register, supplied m bit scrambling key data k (k1 in FIG. 9), takes data k (k1 in FIG. 9) as an initial value in response to a load signal (LOAD). Each shift register also receives a clock CK, so that it shifts data in response to a clock CK, to provide a given output NOUT (NOUT 1 in FIG. 9).

Other construction

The foregoing descrambling code must be identical to a scrambling code which is used on a sender side. The construction for determining the value of a scrambling code on the sender side is identical to that for determining the value of a descrambling code on a receiver side, though the sender side does not need a construction for limiting generation of a first key only to within a given period of time.

Among a variety of VICS services, there may be some services where not scrambling is preferred. Those services may be transmitted without scrambling. Thus, it is preferable to control a descrambling operation in accordance with the content of service identification data in a prefix such that a descrambling code PNOUT will not be generated for given service identifications, which represent services not scrambled.

What is claimed is:

1. A descrambling device for use in a receiver for FM multi-channel broadcasting in which a data packet constituting a given number of digital data is scrambled and multiplexed for general FM broadcasting, comprising:

a key data holding circuit for holding key data extracted from a predetermined part of a received data;

a scrambling key generation circuit for generating a scrambling key based on the key data;

a random number generator for generating a random number using the scrambling key as an initial value;

a logical circuit for descrambling the received scrambled data based on the random number; and a timing generation circuit for outputting a timing signal in response to a receiving timing of data within the received data packet; wherein the timing signal controls the timing of the generation of the scrambling key in the scrambling key generation circuit.

2. A descrambling device according to claim 1, wherein the scrambling key generation circuit generates a scrambling key during only a given period, in response to the timing signal output from the timing generation circuit.

3. A descrambling device according to claim 1, wherein the timing generation circuit includes analyzing means for analyzing prefix data of the data packet in the transmission data, and controls a descrambling operation, based on a content of the prefix data which has been detected by the analyzing means.

4. A descrambling device according to claim 1, wherein the timing generation circuit includes a bit position recognition circuit for recognizing positions of respective data within the data packet, and controls an descrambling operation, based on a recognition result by the bit position recognition circuit.

5. A descrambling device according to claim 1, wherein the timing generation circuit includes analyzing means for analyzing prefix data of the data packet in the transmission data and a bit position recognition circuit for recognizing positions of respective data within the data packet, and controls a descrambling operation, based on a content of the prefix data which has been detected by the analyzing means and a recognition result by the bit position recognition circuit.

6. A descrambling device according to claim 1, wherein the random number generator includes a shift register of a given number of bits for receiving the scrambling key as an initial value, and a logical feedback circuit for executing a logical operation using a given output of the shift register and for feeding back an operation result, the given output of the shift register comprising a plurality of bits.

7. A descrambling device for use in a receiver for FM multi-channel broadcasting in which a data packet constituting a given number of digital data is scrambled and multiplexed for general FM broadcasting, comprising:

a first key data holding circuit for holding first key data extracted from a first predetermined part of a received data packet;

a second key data holding circuit for holding second key data extracted from a second predetermined part of a received data packet;

a first key generation circuit for generating a first key based on the first key data;

a second key generation circuit for generating a second key based on the second key data;

a first logical circuit for performing a logical operation on the first and second keys to generate a scrambling key;

a random number generator for generating a random number using the scrambling key as an initial value;

a second logical circuit for descrambling the received scrambled data based on the random number; and a timing generation circuit for outputting a timing signal in response to a receiving timing of data within the received data packet; wherein the timing signal controls the timing of the generation of the first key in the first key generation circuit.

8. A descrambling device according to claim 7, wherein the first key generation circuit generates a first key only during a given period, in response to the timing signal output from the timing generation circuit.

9. A descrambling device according to claim 7, wherein the timing generation circuit includes analyzing means for analyzing prefix data of the data packet in the transmission data, and controls a descrambling operation, based on a content of the prefixed data which has been detected by the analyzing means.

10. A descrambling device according to claim 7, wherein the timing generation circuit includes a bit position recognition circuit for recognizing positions of respective data within the data packet, and controls a descrambling operation, based on a recognition result by the bit position recognition circuit.

11. A descrambling device according to claim 7, wherein the timing generation circuit includes analyzing means for analyzing prefix data of the data packet in the transmission data and a bit position recognition circuit for recognizing positions of respective data within the data packet, and controls a descrambling operation, based on a content of the prefixed data which has been detected by the analyzing means and a recognition result by the bit position recognition circuit.

12. A descrambling device according to claim 7, wherein the random number generator includes a shift register of a given number of bits for receiving the scrambling key as an initial value, and a logical feedback circuit for executing a logical operation using a given output of the shift register and for feeding back an operation result, the given output of the shift register comprising a plurality of bits.

13. A descrambling device for use in a receiver for an FM multi-channel broadcasting in which scrambled data is multiplexed for general FM broadcasting, comprising:

scrambling key generation means for generating a scrambling key, based on a key data contained in data transmitted;

descrambling means for generating a random number, based on the scrambling key, and for performing a descrambling operation using the random number; and limitation means for limiting a period when the scrambling key generation means generates a scrambling key, in response to a receiving timing of data transmitted.

14. A descrambling apparatus for descrambling received scrambled data packets, the data packets containing key data, the apparatus comprising:

a circuit for extracting the key data from the data packet;

a scrambling key generation circuit for generating a scrambling key based on the key data;

a circuit for generating a descrambling signal based on the scrambling key;

a logical circuit for descrambling the received scrambled data using the descrambling signal; and a timing generation circuit for outputting a timing signal based on the timing of events within the received data packet to control the timing of the generation of the scrambling key, wherein the scrambling key is generated only during a predetermined time period within the duration of a data packet and is destroyed after the time period.

15. A method for descrambling received scrambled data packets, the data packets containing key data, the method comprising:

extracting the key data from the data packet;

detecting a timing event within the data packet;

generating a scrambling key based on the key data in response to the detection of the timing event;

generating a descrambling signal based on the scrambling key;

destroying the scrambling key after a predetermined time period after the detection of the timing event; and descrambling the received scrambled data using the descrambling signal.

* * * * *